(12) United States Patent
Nomura et al.

(10) Patent No.: US 6,623,838 B1
(45) Date of Patent: Sep. 23, 2003

(54) LIGHTWEIGHT RESIN MOLDED PRODUCT AND PRODUCTION METHOD THEREOF

(75) Inventors: Manabu Nomura, Ichihara (JP); Toru Shima, Ichihara (JP); Atsushi Sato, Ichihara (JP); Hirofumi Gouda, Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/508,091

(22) PCT Filed: Jul. 16, 1999

(86) PCT No.: PCT/JP99/03845
§ 371 (c)(1),
(2), (4) Date: Mar. 16, 2000

(87) PCT Pub. No.: WO00/03859
PCT Pub. Date: Jan. 27, 2000

(30) Foreign Application Priority Data

Jul. 16, 1998 (JP) ............................. 10-201023
Jul. 16, 1998 (JP) ............................. 10-201024

(51) Int. Cl.[7] ............................. B32B 3/28; B32B 3/20; D01D 5/24; B29B 7/00
(52) U.S. Cl. ..................... 428/167; 428/188; 428/213; 428/313.3; 428/317.9; 264/171.26; 264/209.1; 264/319; 264/328.1
(58) Field of Search ............................. 428/167, 178, 428/188, 120, 213, 304.4, 313.3, 317.9; 264/171.26, 209.1, 319, 328.1

(56) References Cited

U.S. PATENT DOCUMENTS 3,941,157 A * 3/1976 Barnett ................. 138/115
4,788,777 A * 12/1988 Davis ..................... 34/24

FOREIGN PATENT DOCUMENTS

| JP | 7-247679 | 9/1995 |
| JP | 7-276479 | 10/1995 |
| JP | 8-111151 | 4/1996 |
| JP | 8-325385 | 12/1996 |
| JP | 10-305467 | 11/1998 |
| JP | 11-42665 | 2/1999 |
| JP | 11-179749 | 7/1999 |
| WO | WO97/29896 | 1/2000 |

* cited by examiner

Primary Examiner—Donald J. Loney
(74) Attorney, Agent, or Firm—Oblon, Spivak, McClelland, Maier & Neustadt, P.C.

(57) ABSTRACT

Using a mold equipped with a rib-forming member capable of moving forward and backward relative to the mold cavity, produced is a lightweight, hollow resin molding having a reinforcing rib structure in the hollow area, from a fiber-containing thermoplastic resin having a fiber content of from 10 to 70% by weight. To produce the molding, a melt of a fiber-containing thermoplastic resin is injected into the mold cavity or is injected thereinto under compression, then the movable mold member is moved backward in the direction in which the mold cavity is expandable, and after the start of the mold member moving, a gas is introduced into the resin melt. Even though the molding has a hollow structure and has a large surface area, it has good stiffness and high strength, and has good appearances. The weight of the molding can be well controlled and reduced to any desired degree. The molding has many applications in various fields.

18 Claims, 2 Drawing Sheets

(B)

(A)

(B)

LIGHTWEIGHT RESIN MOLDED PRODUCT AND PRODUCTION METHOD THEREOF

TECHNICAL FIELD

The present invention relates to lightweight resin moldings and to a method for producing them. Precisely, it relates to fiber-containing, lightweight resin moldings with good appearances which, though being lightweight, bear all the characteristics of high stiffness, high flexural strength, high impact strength, good uniformity in such mechanical strength, and high resistance to local stress and distortion, and also relates to an efficient method for producing them.

BACKGROUND ART

Heretofore known are fiber-reinforced resin moldings, which are reinforced with fibers such as glass fibers and the like added thereto. As having good mechanical properties of high tensile strength and high flexural strength and having good heat resistance, fiber-reinforced resin moldings are widely used in various fields of, for example, car parts such as in-panel cores, bumper beams, door steps, roof racks, rear quarter panels, air cleaner cases, etc.; chassises for electric appliances such as radios, televisions, videos, etc.; housings and components of computers, printers, duplicators, etc.; parts and members for furniture, buildings and civil engineering construction, such as outer panels, partition panels, shelf boards, cable troughs, etc. For producing such fiber-reinforced resin moldings, employable is an injection-molding method of injecting a fiber-containing resin melt into molds. According to the injection-molding method, even complicated moldings are obtainable. In addition, another advantage of the method is that a large number of moldings all having the same shape can be produced on a mass-production scale since a predetermined molding cycle of the method can be repeated continuously.

To enhance the strength and the stiffness of fiber-reinforced resin moldings produced in such an injection-molding method, the amount of the fibers to be in the moldings may be increased. However, the increase in the fiber content of the moldings results in the increase in the weight of the moldings, often enlarging the degree of warping deformation of the moldings. Therefore, to reduce the weight of the moldings, a foaming agent may be added to the molding materials. A foam injection-molding method of foaming and molding a molding resin material containing a foaming agent has been proposed (see Japanese Patent Laid-Open No. 247679/1995, etc.). In the foam injection-molding method, however, it is not easy to attain a satisfactorily high blow ratio of moldings, even though a relatively large amount of the foaming agent is added to the molding materials so as to reduce the weight of the foamed moldings to a satisfactory degree. In addition, even when a satisfactorily high blow ratio of moldings could be attained in the method, the mold pattern transferability onto the moldings is not so good, and the moldings will have many silver streaks on their surface, and their appearances will be poor. What is more, the moldings could not have high strength and good stiffness.

To solve the problems, some other methods have been proposed for reducing the weight of resin moldings while making them have good mechanical properties of high strength, good stiffness and high impact resistance and have good appearance quality. (1) One is a blow-molding method of producing lightweight moldings, for which are used fiber-reinforced resin pellets that contain relatively long reinforcing fibers. In the method, the resin pellets are molded into lightweight moldings while the resin is expanded by the spring-back function of the fibers. (2) Another is to add a foaming agent to the fiber-reinforced resin pellets in the blow-molding method (1). In this, the foaming agent added promotes the resin expansion, and the weight of the moldings produced could be reduced more. (See PCT/97/29896.) In these methods, the weight of the moldings produced could be well reduced and the mechanical properties of the moldings will not be so much worsened. Therefore, the methods will be effective for reducing the weight of fiber-reinforced resin moldings.

On the other hand, a method of reducing the weight of resin moldings is well known, which comprises introducing a pressure fluid into a mold cavity filled with a resin melt to be molded, and moving a moving mold member in the mold-opening direction to enlarge the mold cavity volume thereby forming a hollow space in the resulting resin molding. In this method, however, the resin melt adjacent to the facing mold member surfaces is stretched and drawn when the moving mold member is moved in the mold-opening direction, and, in addition, the surfaces of the resin molding adjacent to the facing mold members often have a large number of irregular projections owing to the influence thereon of the pressure fluid (vapor) having introduced into the mold cavity. The shape, the position and the size of the projections could not be controlled in the method. The projections have no meaning in planning the ribs of the resin moldings to be produced therein, but are rather problematic for the surface appearances of the moldings as causing sinkmarks in the surface of the moldings and even surface gloss unevenness of the moldings.

(3) To prevent the formation of the projections, still another method has been proposed, for which is used a low-foaming thermoplastic resin to be molded. In the method, a melt of the resin is injected into a mold cavity, then the cavity volume is enlarged in the primary stage, and thereafter the cavity volume is further enlarged in the secondary stage with an inert pressure fluid being introduced into the cavity under pressure. In this, a hollow space of the molding produced is formed in the secondary stage of cavity volume expansion. (See Japanese Patent Laid-Open No. 11151/1996.) However, the methods (1) and (2) noted above are still problematic in that the properties of the moldings obtained in those methods depend on the degree of reduction in their weight (that is, the degree of expansion in producing them) and on their shape. For example, some moldings having a large surface area (that is, large-surface moldings) often have low flexural strength and poor stiffness, and the moldings materials for them are specifically limited. Some others having a much reduced weight, for example those having been expanded to a degree of blow ratio of larger than 2 will often have poor flexural deformation resistance and poor flexural stiffness when they are so constructed that their inner structure is to have a uniform porosity. This is because, in the moldings of that type, the density of the center area in the thickness direction is greatly lowered. In the method (3), lightweight moldings having no surface projections and having good surface condition are obtainable. However, in the moldings having a relatively large surface area obtained in the method, the hollow space between the opposite surfaces will negatively act on the physical properties of the moldings, and, as a result, the moldings could not often have good stiffness and high strength. In addition, the method requires a relatively large amount of a foaming agent to be added to the molding resin materials, and such a large amount of the foaming agent added causes silver streaks to be formed in the surfaces of the moldings. What is more, in the method, the foaming degree of the foaming agent used must be controlled, and for this, the resin melt to be molded must be counter-pressured while it is injected into the mold cavity. For these reasons, the application of the method will be much limited. The object of the present invention is to provide lightweight resin moldings of which the advantages are that the latitude in selecting the molding materials to be used for them is broad, that the moldings have good stiffness and high strength even though they have a hollow space and have a large surface area, that the moldings have good appearances, that the latitude in controlling and reducing the weight of the moldings is broad, and that the moldings have many applications in various fields; and also to provide an efficient method for producing the moldings.

DISCLOSURE OF THE INVENTION

Given that situation as above, we, the present inventors have assiduously studied various starting resins for blow-injection molding and the moldings from them, and also the relationship between the reduction in the weight of the moldings and the inner structures and the physical properties of the weight-reduced moldings. As a result, we have found the following matters: In preferred inner structures of fiber-containing moldings, the pores do not form a hollow space but are substantially uniformly dispersed. However, for the moldings of which the weight is reduced to a higher degree, the molding conditions to form the preferred structures as above are limited to an extremely narrow range, and it is often difficult to stably form the intended structures. Therefore, depending on the molding conditions employed, the moldings could not often have high strength and good stiffness since their inner density, especially that in the center area in the thickness direction is often greatly lowered. For the moldings of which the weight is reduced to a higher degree, it is desirable to form a hollow space between the opposite surfaces of each molding and to form a reinforcing rib structure between them, and the moldings constructed in that manner can be stably produced on an industrial scale and have good stiffness and high strength.

We have further found the following matters: When a mold equipped with a rib-forming member is used, the intended lightweight resin moldings having good stiffness, high strength and good appearances can be produced efficiently. For producing the moldings by the use of the mold of that type, a melt of a molding material that comprises a specific fiber-containing thermoplastic resin is injected into the mold cavity or is injected and compressed thereinto, then the mold cavity volume is expanded, and a gas is introduced into the resin melt after the start of the cavity expansion.

We have found that lightweight resin moldings having good stiffness, high strength and good appearances can be produced from fiber-containing, foamable molding materials by the use of the mold having the structure as above and by introducing a gas into the resin melt being molded. On the basis of these findings, we have completed the present invention.

Specifically, the invention provides the following:

1. A lightweight, hollow resin molding having a reinforcing rib structure in the hollow area, which is formed from a fiber-containing thermoplastic resin having a fiber content of from 10 to 70% by weight.
2. The lightweight resin molding of above 1, which has pores and of which the porosity including its hollow area falls between 25 and 95%.
3. The lightweight resin molding of above 2, wherein the pores are air-permeable ones.
4. The lightweight resin molding of above 3, wherein the air-permeable pores are dispersed.
5. The lightweight resin molding of above 1, wherein the fibers are glass fibers having a mean fiber length of from 0.2 to 20 mm.
6. The lightweight resin molding of above 1, wherein the fibers are glass fibers having a mean fiber length of from 2 to 15 mm.
7. The lightweight resin molding of above 1, wherein the reinforcing rib(s) is/are in the hollow area between the opposite surfaces of the molding.
8. A method for producing a lightweight, hollow resin molding having a reinforcing rib structure in the hollow area, from a fiber-containing thermoplastic resin having a fiber content of from 10 to 70% by weight, by the use of a mold equipped with a rib-forming member; the method comprising injecting a melt of a fiber-containing molding material which comprises a fiber-containing thermoplastic resin and in which the fibers have a mean fiber length of from 2 to 50 mm, into the mold cavity or injecting and compressing the melt thereinto, then expanding the mold cavity volume, and introducing a gas into the resin melt after the start of the cavity expansion.
9. The method for producing a lightweight resin molding of above 8, wherein the mold equipped with a rib-forming member is so constructed that its cavity except the rib-forming area is expandable.
10. The method for producing a lightweight resin molding of above 8, wherein the mold equipped with a rib-forming member is so constructed that at least one of the facing surfaces of the mold members is partially protruded or recessed.
11. The method for producing a lightweight resin molding of above 8, wherein the fiber-containing thermoplastic resin melt is prepared by plasticizing and melting fiber-containing thermoplastic resin pellets which have a total length of from 2 to 50 mm and contain fibers in an amount of from 20 to 80% by weight thereof, and in which the length of the fibers is the same as the total length of the pellets and the fibers are aligned in parallel to each other, or by plasticizing and melting a mixture of the fiber-containing resin pellets and other pellets of which the fiber content falls between 10 to 70% by weight thereof.
12. The method for producing a lightweight resin molding of above 8, wherein the speed at which the moving mold member is moved backward for expanding the mold cavity volume falls between 1 and 200 mm/sec.
13. The method for producing a lightweight resin molding of above 8, wherein a fiber-containing, foamable thermoplastic resin melt is injected into the mold cavity or is injected and compressed thereinto to thereby fill the mold cavity with the resin melt, then the mold cavity volume is expanded, and a gas is introduced into the resin melt after the start of the cavity expansion.
14. The method for producing a lightweight resin molding of above 8, wherein the melt of a fiber-containing molding material which comprises a fiber-containing thermoplastic resin and in which the fibers have a mean fiber length of from 2 to 50 mm contains from 0.5 to 10 parts by weight, relative to 100 parts by weight of the fiber-containing resin, of a foaming agent.

15. The method for producing a lightweight resin molding of above 8, wherein the expansion ratio of the mold cavity volume falls between 1.3 and 20.

16. The method for producing a lightweight resin molding of above 10, wherein a rib-corresponding part having a relatively higher density is formed between the surfaces of the mold members that face to each other in the cavity volume-expanding direction.

17. The method for producing a lightweight resin molding of above 8, wherein the cavity volume expansion is effected by moving a part of one mold member that forms the cavity.

Figure 1:
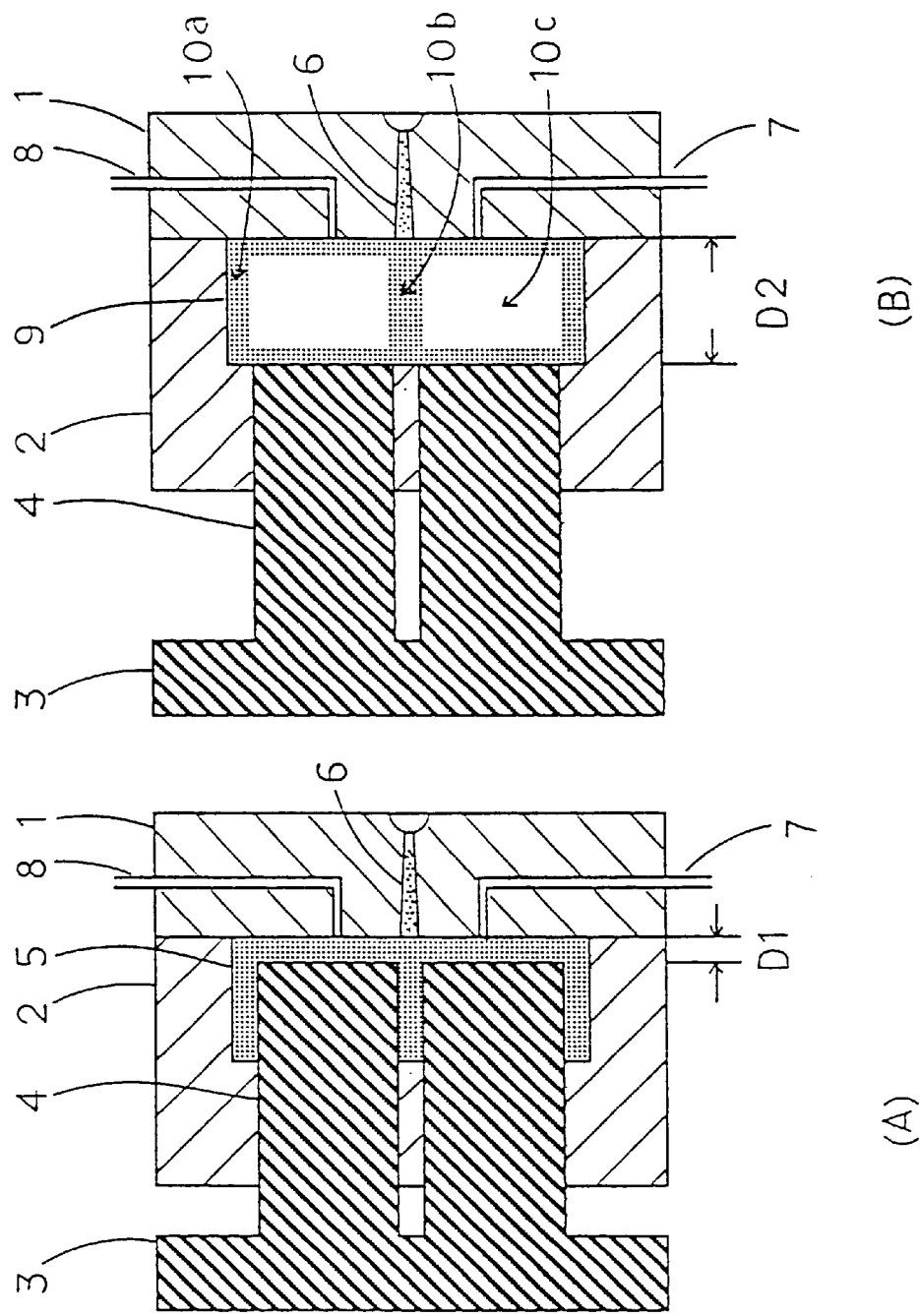
FIG. 1 is a conceptual view illustrating the first embodiment of the invention, in which (A) indicates the condition of an injection mold before the mold cavity is expanded, and (B) indicates the condition thereof after the mold cavity has been expanded.

In these drawings, 1 is a fixed mold unit; 2 is a movable mold unit; 3 is a moving mold member; 4 is a protrusion of the moving mold member; 5 is a mold cavity; 6 is a sprue; 7 is a gas-introducing inlet; 8 is a gas-introducing inlet; 9 is a lightweight resin molding; 10a, 10b and 10c are the parts of the molding.

BEST MODES OF CARRYING OUT THE INVENTION

The invention is described in detail hereinunder.

The lightweight resin molding and the method for producing it of the invention are described with reference to some embodiments of the method. The method for producing the lightweight resin molding of the invention comprises injecting a melt of a specific molding resin material that comprises a fiber-containing thermoplastic resin into the cavity of a mold to thereby fill the mold cavity with the resin melt, then expanding the mold cavity volume, and introducing a gas into the resin melt, for which the mold used has a rib-forming structure so that the resin molding produced could have a reinforcing rib structure in its hollow area. Specifically, in the first and second embodiments of the invention, a foaming agent is not substantially used, and the same effect as that of a foaming agent is attained by the spring-back function of the fibers that are entangled in the moldings produced. Therefore, the invention is free from any foaming failure in expanding the resin melt to give resin moldings, and does not require any specific equipment for counter pressure against the resin melt being molded. What is more, the resin moldings produced are well reinforced with the fibers therein and, in addition, they have a rib structure in their hollow area and therefore their stiffness and strength are significantly increased.

In the first and second embodiments of the invention for producing the lightweight resin moldings, a gas is introduced into the resin melt in accordance with the mold cavity expansion to thereby form a hollow area in the moldings, and therefore the weight of the moldings is reduced. The reduction in the weight of the moldings may be fixed, depending on the mold cavity volume to be filled with the resin melt. As having the specific rib structure in their hollow area, the hollow moldings of the invention have much better stiffness and much higher strength, as compared with other hollow moldings having the same weight as that of the hollow moldings of the invention. Therefore, the hollow moldings of the invention contribute to reducing the weight of cars and to saving natural resources.

As so mentioned hereinabove, we, the present inventors have already proposed a method of utilizing the spring-back function of fiber-containing resins for producing lightweight resin moldings. The method proposed is characterized in that the moldings produced have a wholly expanded, fiber-containing resin structure. However, the method is often problematic in that the inside density, especially that in the center area in the thickness direction of some moldings having a high blow ratio is greatly lowered, and, as the case may be, the method could not attain the intended object. The method for producing the lightweight resin moldings of the present invention is to solve the problems with the previously proposed method. Specifically, in the method of the invention, the weight of the moldings produced is reduced by utilizing the expandable characteristic of the fiber-containing resin to be molded, and the mechanical properties of the moldings are improved by forming a rib structure inside the moldings.

In the first and second embodiments of the invention, the resin melt is expanded not wholly but partially to give the intended, selectively hollow-structured moldings. For this, in the method of invention, a gas is introduced into the fiber-containing resin melt in the mold cavity in the initial stage in which the resin melt begins to expand in accordance with the cavity expansion; the mold cavity expansion rate is promoted; and the gas flow speed is accelerated to increase the amount of the gas to be introduced into the resin melt. Accordingly, in the invention, the molding materials and also the molding conditions can be suitably selected whereby the reduction in the weight of the moldings to be produced can be controlled to any desired degree and, in addition, the expansion of the fiber-containing resin moiety of the resin melt can also be controlled to any desired degree.

According to the method noted above, the weight of the moldings to be produced can be reduced, but the hollow area of the moldings will participate in only the weight reduction. In particular, the moldings having a blow ratio of 3 or more will have poor stiffness and low strength and will therefore be useless in practical applications. On the other hand, it will be desirable that the moldings having a blow ratio of not larger than 3 rather have a wholly solid expanded structure (with pores dispersed therein) but not a hollow structure. Therefore, in the invention, the moldings must have a rib structure in their hollow area. For forming the rib structure in the hollow area of the moldings, it is not necessary to specifically define the structure of the mold to be used. Any desired mold may be used, depending on the shape of the moldings to be produced. Some embodiments for forming the rib structure in the hollow area of the moldings are described below.

The mold for use in one embodiment of the invention is equipped with a moving mold member (core) having a plurality of cavity-forming planes, and the mold cavity volume is expanded by moving the moving mold member backward in the cavity-expanding direction. Conventional moving mold members (cores) have a simple structure with a single flat surface facing to the mold cavity. Using them, produced are plain-structured moldings with a hollow area having a nearly uniform thickness. In producing the moldings of that type, the resin melt adjacent to the mold cavity is cooled and forms a non-expanded skin layer. Therefore, the resin moldings produced are lightweight and have high strength and good stiffness. However, when the resin moldings having such a three-layered structure of skin layer/hollow layer/skin layer as so aligned in the thickness direction have a large volume per unit area, their stiffness will be poor and therefore their resistance to local stress and distortion will be often poor.

In the first and second embodiments of the invention, the skin layers of the opposite surfaces of the molding are bonded to each other via a reinforcing rib structure of a fiber-containing resin so as to solve the problems with the conventional resin moldings as above. For this, in the method of producing the resin moldings of the invention, used is a mold equipped with a moving mold member having a plurality of cavity-forming planes (that is, having a plurality of moving planes). The moving mold member is movable forward and backward relative to the mold cavity. Concretely, in the method, a melt of the specific molding material comprising a fiber-containing thermoplastic resin is injected into the mold cavity while the cavity-forming planes of the moving mold member are in the cavity-closed position with the clearance being left in that position, and thereafter the moving mold member is moved backward in the mold cavity-expanding direction.

The shape and the number of the protrusions of the moving mold member (core) having a plurality of cavity-forming planes may be determined in any desired manner, depending on the size of the moldings to be produced and on the necessary properties of the moldings. Similarly, the condition of the plural protrusions of the moving mold member may also be determined in any desired manner. In general, however, the plural protrusions will be so positioned that they could have a suitable degree of clearance between the facing surfaces of the two mold members in consideration of the blow ratio of the moldings to be produced. After the start of the mold cavity expansion, a gas such as nitrogen gas or the like is introduced into the fiber-containing resin melt in the cavity. In the initial stage of expanding the mold cavity, the fiber-containing resin melt in the cavity begins to expand. Then, in the next stage of gas introduction into the cavity, a good hollow area is formed in the expanded resin melt. In these steps, in particular, the cavity for the moldings to be produced is the same as the mold cavity to be expanded both in the peripheral area and the center area of the moldings, and therefore the gas is readily introduced into the resin melt while the moving mold member is moved backward in the cavity-expanding direction. As a result, the hollow area is surely formed in the moldings, and, at the same time, a definite rib structure is surely formed in the hollow area. The gas having been introduced into the resin melt acts to expand the volume of the hollow area, while pressing the fiber-containing resin melt against the surfaces of the mold members. In that condition, the resin melt is cooled while being kept in close contact with the surfaces of the mold members. Therefore, the moldings thus produced do not have sinkmarks on their surface. Where the gas having been introduced into the resin melt is circulated through the mold, cooling the resin moldings formed in the mold is promoted, and the molding cycle efficiency is enhanced. The gas may be accompanied with a volatile liquid such as water so as to enhance its cooling effect.

In preferred embodiments of the method of the invention, the molding material to be used comprises a fiber-containing thermoplastic resin having a fiber content of from 10 to 70% by weight, in which the fibers have a mean fiber length of from 2 to 50 mm. More preferably used is a melt of fiber-containing thermoplastic resin pellets which have a total length of from 2 to 50 mm and contain fibers in an amount of from 20 to 80% by weight thereof, and in which the length of the fibers is the same as the total length of the pellets and the fibers are aligned in parallel to each other, or a melt of the fiber-containing resin pellets and other pellets of which the fiber content falls between 10 to 70% by weight thereof. The other pellets in the mixture are generally of a thermoplastic resin optionally containing some additives. As the case maybe, they may be pellets to be prepared from a melt of glass fibers or the like. Suitably selected molding materials could well exhibit their spring-back function.

In the first and second embodiments of the invention where the lightweight resin moldings produced have a relatively large blow ratio, the mold member for forming the rib structure in the moldings is not always required to have a fine rib-forming structure. In the resin moldings of that type, not only the hollow space but also the rib structure is expanded to have a porous lightweight structure, and the weight of the resin moldings is much reduced. For the resin moldings of that type, therefore, the mold to be used may be so planned that its rib-forming member could function to form the intended rib structure in the hollow area of the moldings. For example, either one of the fixed mold unit or the movable mold unit may be so constructed that its cavity-facing surface could be partly protruded. In this case, the resin melt adjacent to the protruded surface of the mold member is more rapidly cooled than the other part of the resin melt, and its melt viscosity increases rapidly so as to retard the expansion of the resin melt, whereby the intended rib structure is formed in the hollow area of the moldings. On the other hand, either the fixed mold unit or the movable mold unit may be so constructed that its cavity-facing surface is partly recessed. In this case, the amount of the resin melt to be in the recesses shall be large, and the resin melt in those recesses forms the rib structure in the hollow space of the moldings. The position in which the rib structure is to be formed and the shape of the rib structure are not specifically defined. The rib structure may have any form of linear, lattice-like or isolated shapes, and may be suitably determined depending on the product design for the intended lightweight resin moldings.

Forming the hollow area in the moldings could be controlled by changing the conditions for gas introduction into the resin melt. It may also be controlled by changing the cavity-expanding speed, or that is, by changing the backward moving speed of the movable mold unit or the moving mold member. The backward moving speed of the moving mold member may fall between 1 and 200 mm/sec, preferably between 2 and 100 mm/sec. Though depending on the other conditions, increasing the backward moving speed of the moving mold member in some degree will have some positive influence on the selective formation of the hollow area in the moldings.

The lightweight resin moldings of the invention have a fiber content of from 10 to 70% by weight, preferably from 15 to 60% by weight. If the fiber content of the moldings is smaller than 10% by weight, the degree of expansion, the strength, the stiffness and the heat resistance thereof will be poor. However, if it is larger than 70% by weight, the fluidity of the resin melt will be low. If so, the moldability of the resin melt will be poor, and the appearances and also the degree of expansion of the moldings will be poor and low. The lightweight resin moldings of the invention are formed from the fiber-containing thermoplastic resin having the defined fiber content as above, and have an open cellular structure with a hollow area. In the hollow area thereof, the moldings have a reinforcing rib structure. The weight of the moldings is reduced. Specifically, the porosity including the hollow area of the weight-reduced moldings may fall between 30 and 95%, preferably between 40 and 90%, though varying depending on the type and the amount of the fibers to be in the moldings and on the necessary properties of the moldings. As the fibers, preferred are glass fibers. Preferably, the mean fiber length of the fibers existing in the moldings falls between 0.2 and 20 mm, more preferably between 2 and 15 mm.

The first and second embodiments of the invention are described below with reference to the drawings attached hereto.

Figure 2:
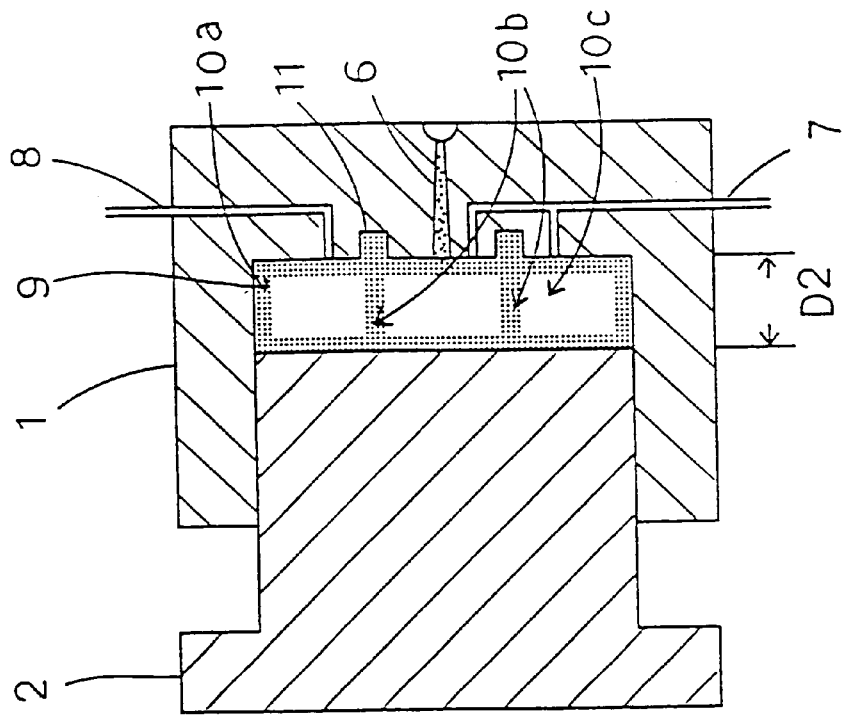
FIG. 2 is a conceptual view illustrating the second embodiment of the invention for skin-integrated molding, in which (A) indicates the condition of an injection mold before the mold cavity is expanded, and (B) indicates the condition thereof after the mold cavity has been expanded.
Figure 2:
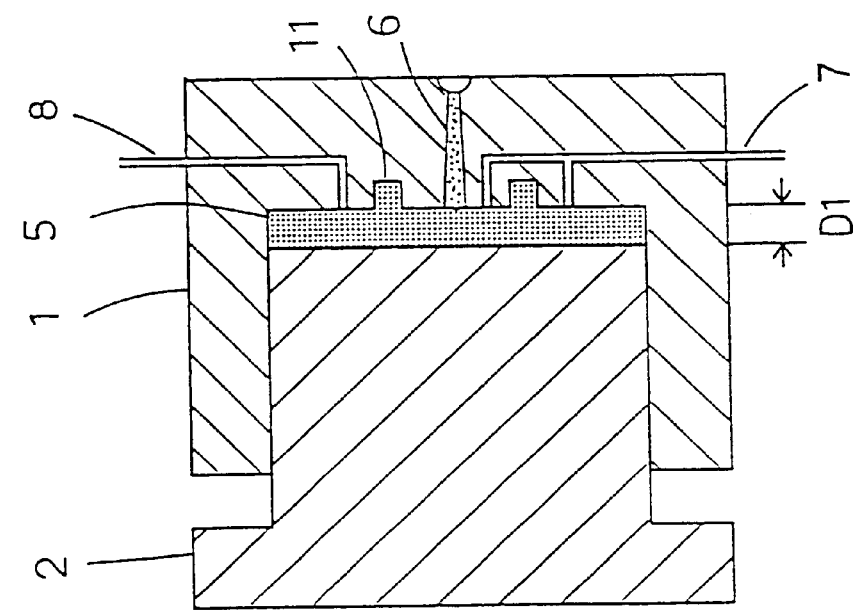

FIG. 1 is a conceptual view illustrating the first embodiment of the method of the invention for producing lightweight resin moldings. FIG. 2 is a conceptual view illustrating the second embodiment of the method of the invention for producing lightweight resin moldings. In these, 1 is a fixed mold unit; 2 is a movable mold unit; 3 is a moving mold member; 4 is a protrusion of the moving mold member; 5 is a mold cavity; 6 is a sprue; 7 and 8 are gas-introducing inlets; 9 is a lightweight resin molding; 10a, 10b and 10c are the parts of the lightweight resin molding. Of these, (A) indicates the condition of the injection mold into which a fiber-containing resin melt has been injected but of which the mold cavity is not expanded, and (B) indicates the condition thereof after the mold cavity has been expanded.

As in FIG. 1 illustrating the first embodiment of the method of the invention for producing lightweight resin moldings, the mold is closed by clamping the fixed mold unit 1 and the movable molt unit 2, and the moving mold member 3 having a plurality of protrusions is moved into the cavity 5 to determine the mold cavity volume into which a resin melt is injected. In this step, the top of each protrusion of the moving mold member is so positioned that it ensures the clearance D1 in the direction of the thickness of the molding to be produced. The clearance D1 and the shape of the moving mold member (that is, the shape of each protrusion of the member) may be suitably determined, depending on the shape of the molding, the final product to be produced in the mold and on the reduced weight of the molding. In that condition, a melt of a fiber-containing thermoplastic resin to be molded is injected into the cavity 5 via the sprue 6 connected with a nozzle (not shown) of a device in which the resin is melted and plasticized, so that the cavity 5 is filled with the resin melt. Thus, the mold pattern is surely transferred onto the resin melt owing to the resin injection pressure. The resin melt thus having been injected into the cavity is cooled at its part contacted with the mold surface. Next, the moving mold member 3 is moved backward to the position of D2 as in FIG. 1(B). That is, the cavity volume is so expanded that it may be the same as the volume of the final molding, and nitrogen gas is introduced into the resin melt via the gas-introducing inlets. If desired, the gas may be introduced thereinto at the same time when the backward moving of the moving mold member 3 is started.

With the moving mold member 3 being thus moved backward, the fiber-containing thermoplastic resin melt is expanded owing to the restoring ability of the entangled fibers therein. Then, the gas is selectively introduced into the expanded area of the resin melt, and the hollow area is formed. At the same time, a reinforcing rib structure is formed in the hollow area. In that condition, the resin melt is pressed against the wall surface of the mold and is shaped to have the final form of the molding. In this process, the moving mold member is moved backward at a speed of from 1 to 200 mm/sec, preferably from 2 to 100 mm/sec. After cooled, the mold is degassed and opened, and the lightweight resin molding formed therein is taken out. In the invention, the moving mold member used has a plurality of protrusions all protruding in the direction of the thickness of the mold in the area not around the periphery of the mold, for example, in the center area of the mold. Using the moving mold member of that type, the resin melt is injected into the mold cavity. With this, therefore, not only in the peripheral area of the mold but also in the other area where the flat structure of the molding is formed, the resin melt is cooled. The moving mold member is moved backward so as to expand the resin melt existing in the mold cavity, and a gas is then introduced into the resin melt thereby to make the resulting resin molding have the intended hollow area. The resin melt thus having been expanded in the mold cavity is cooled, whereby its melt viscosity is increased. Therefore, the region of the hollow area is no more substantially expanded, or even if expanded, the degree of expansion of the hollow area is lowered.

In that manner, the lightweight resin molding produced shall have the hollow area 10c. Of the molding, not only the peripheral part 10a but also the center part 10b to be a reinforcing rib has a densified structure of the fiber-containing resin. One of the gas-introducing inlets may be equipped with a control valve to be a gas-discharging outlet. In that constitution, the pressure to the gas-discharging outlet may be controlled to a predetermined degree and the gas having been introduced into the mold may be circulated through the mold and discharged away through the outlet, whereby the molding being produced in the mold may be cooled in an accelerated manner.

FIG. 2 is referred to, which illustrate the second embodiment of the method of the invention for producing lightweight resin moldings. As illustrated, the mold is closed by clamping the fixed mold unit 1 and the movable molt unit 2, to thereby determine the mold cavity volume into which a resin melt is injected. In this step, the movable mold unit 2 is so positioned relative to the essential part of the fixed mold unit 1 that the two units could keep the clearance D1 in the direction of the thickness of the molding to be produced. This embodiment is characterized in that the cavity-facing surface of the fixed mold unit 1 is partially recessed to have the recesses 11. In this, the gas-introducing nozzles are provided in the area not having the recesses. The clearance D1 and the shape of the recesses may be suitably determined, depending on the shape of the molding, the final product to be produced in the mold and on the reduced weight of the molding. In that condition, a melt of a fiber-containing thermoplastic resin to be molded is injected into the cavity 5 via the sprue 6 connected with a nozzle (not shown) of a device in which the resin is melted and plasticized, so that the cavity 5 is filled with the resin melt. Thus, the mold pattern is surely transferred onto the resin melt owing to the resin injection pressure.

The resin melt thus having been injected into the cavity is cooled at its part contacted with the mold surface. Next, the moving mold member 3 is moved backward to the position of D2 as in FIG. 2(B). That is, the cavity volume is so expanded that it may be the same as the volume of the final molding, and nitrogen gas is introduced into the resin melt via the gas-introducing inlets 7 and 8. If desired, the gas may be introduced thereinto at the same time when the backward moving of the moving mold member 3 is started. With the moving mold member 3 being thus moved backward, the fiber-containing thermoplastic resin melt is expanded owing to the restoring ability of the entangled fibers therein. In that condition, the amount of the resin melt in the recesses of the mold is larger than that in the other area, and is therefore expanded to a smaller degree than in the other area. As a result, the resin melt in the recesses forms the rib-corresponding structure to be in the hollow area of the molding to be produced. The reinforcing rib structure of such a low-expansion region, which is formed in accordance with the shape of the recesses of the mold surface, may have any form of isolated linear, or open linear, or even lattice-like shapes, though depending on the shape of the molding to be produced.

The thermoplastic resin for use in the invention is not specifically defined, including, for example, polyolefin resins such as polypropylenes, propylene-ethylene block copolymers, propylene-ethylene random copolymers, polyethylenes, etc.; and also polystyrene resins, ABS resins, polyvinyl chloride resins, polyamide resins, polyester resins, polyacetal resins, polycarbonate resins, polyaromatic ether or thioether resins, polyaromatic ester resins, polysulfone resins, acrylate resins, etc. These thermoplastic resins may be used either singly or as combined.

Of the thermoplastic resins, preferred are polypropylene resins such as homopolypropylenes, block copolymers or random copolymers of propylene and other olefins, and their mixtures; and polyamide resins; and more preferred are polypropylene resins containing modified polyolefin resins as modified with unsaturated carboxylic acids or their derivatives. If desired, impact resistance improvers including various elastomers, as well as stabilizers, antistatic agents, weather-proofing agents, colorants, short fibers, and fillers (e.g., talc) may be added to the thermoplastic resins. To the fiber-containing molding materials in which the fibers are too short to exhibit the intended restoring ability, a gas-generating agent such as a foaming agent will be added.

The fibers include, for example, ceramic fibers such as boron fibers, silicon carbide fibers, alumina fibers, silicon nitride fibers, zirconia fibers; inorganic fibers such as glass fibers, carbon fibers; metallic fibers such as copper fibers, brass fibers, steel fibers, stainless fibers, aluminium fibers, aluminium alloy fibers; and organic fibers such as polyester fibers, polyamide fibers, polyarylate fibers, etc.

It is desirable that the fibers to be in the molding materials have a length of from 0.2 to 50 mm or so, in view of the moldability of the materials. The molding materials may be in the form of pellets as prepared by melting, kneading and pelletizing chopped strands and a thermoplastic resin. Preferably, the fiber-containing, molding resin materials are pellets of a fiber-containing thermoplastic resin which have a total length of from 2 to 50 mm and contain fibers in an amount of from 20 to 80% by weight thereof, and in which the length of the fibers is the same as the total length of the pellets and the fibers are aligned in parallel to each other, or they may be in the form of a mixture of such fiber-containing thermoplastic resin pellets and other pellets of which the fiber content falls between 10 to 70% by weight thereof. More preferred are fiber-containing thermoplastic resin pellets which have a total length of from 2 to 50 mm and contain fibers in an amount of from 20 to 80% by weight thereof, and in which the length of the fibers is the same as the total length of the pellets and the fibers are aligned in parallel to each other. The preferred resin pellets having a fiber content of from 20 to 80% by weight, in which the fibers are aligned in parallel to each other, can be well plasticized, melted and kneaded by the action of the screws in the injection molding machine in which the pellets are processed, and the fibers therein are hardly broken and are well dispersed in the resulting resin melt. As a result, the fiber-containing resin melt injected into the cavity of a mold could well exhibit its spring-back function, and, in addition, the length of the fibers remaining in the final moldings could be long, and the final moldings could have improved physical properties and improved surface appearances. Preferably, the plasticizing screws in the injection molding machine for use herein have a relatively low compression ratio, as they do not break the fibers in the resin pellets being processed by them.

The glass fibers usable herein may be of E-glass, S-glass and the like, and preferably have a mean fiber diameter of at most 25 $\mu$m, more preferably falling between 3 and 20 $\mu$m. Glass fibers having a mean fiber diameter of smaller than 3 $\mu$m will be poorly compatible with resins and will hardly receive resins in forming resin pellets with them. On the other hand, glass fibers having a mean fiber diameter of larger than 20 $\mu$m are also unfavorable, since the final moldings containing such thick fibers will have poor appearances and, in addition, such thick fibers could hardly flow into the thin area of the moldings such as the ribs thereof. What is more, such thick fibers will be readily broken while the resin pellets containing them are melted and kneaded, and could not be uniformly dispersed in the resin melt. Before the glass fibers are formed into pellets with a thermoplastic resin through pultrusion or the like, it is desirable that they are subjected to surface treatment with a coupling agent, and the thus treated glass fibers may be bound with a binder into bundles of from 100 to 10000 fibers/bundle, preferably from 150 to 5000 fibers/bundle.

The coupling agent to be used for that purpose may be any conventional one, including silane coupling agents, titanium coupling agents, etc. For example, usable herein are aminosilanes and epoxysilanes such as $\gamma$-aminopropyltrimethoxysilane, N-$\beta$-(aminoethyl)-$\gamma$-aminopropyltrimethoxysilane, $\gamma$-glycidoxypropyltrimethoxysilane, $\beta$-(3,4-epoxycyclohexyl)ethyltrimethoxysilane, etc. Preferred are aminosilane compounds such as those mentioned above.

The binder may be any of urethane-type, olefinic, acrylic, butadiene-type and epoxy binders. Of those, preferred are urethane-type and olefinic binders. The urethane-type binders may contain a polyisocyanate to be prepared through addition polymerization of a diisocyanate compound with a polyalcohol, in a ratio of at least 50% by weight. They may be any of one-liquid type, oil-modified binders, moisture-curable binders and block binders, or two-liquid type, catalyst-curable binders and polyol-curable binders, etc. The olefinic binders may be modified polyolefinic resins as modified with unsaturated carboxylic acids or their derivatives.

To the glass fiber bundles having been thus bound with the binder, a thermoplastic resin is applied through coating or dipping to prepare glass fiber-containing resin pellets. For applying a thermoplastic resin to the glass fibers through coating or dipping, for example, employed is a method of passing the fiber bundles through a melt of the resin thereby infiltrating the resin into the fibers; a method of passing the fiber bundles through a resin-coating die thereby infiltrating the resin into the fibers; or a method of expanding the resin melt having adhered around the fibers by the use of a die thereby infiltrating the resin into the fibers. In order to improve the affinity of the fiber bundles for the resin, or that is, to improve the wettability of the.fiber bundles with the resin, employable is a pultrusion molding method, which comprises passing the resin-applied fiber bundles through a die having small recesses and hills on its inner circumferential surface, under tension, to thereby well infiltrate the resin melt into the fiber bundles, followed by pressing the thus-processed fiber bundles against a pressure roller. For glass fibers having good affinity for a resin melt, or that is, having good wettability with it, it is easy to infiltrate the resin melt into the glass fibers and therefore it is also easy to prepare resin pellets containing the glass fibers. For the glass fibers of that type, therefore, the step of binding them with a binder into bundles may be omitted. To improve the affinity of glass fibers with a resin melt, effectively employed is a method of processing the resin to make it have polarity, or a method of grafting the surface of the glass fibers with functional groups capable of reacting with a coupling agent.

Long fiber bundles (strands, etc.) into which a resin has been infiltrated in the manner noted above may be cut in the lengthwise direction of the fibers to obtain resin pellets in which the length of the long fibers may be the same as the total length of the pellets. In this step, the resin pellets to be prepared are not limited to those of resin-containing, long fiber bundles in which the fiber bundles are in the form of strands having a nearly circular cross section profile, as prepared by cutting the fiber bundles into pellets, but may also be those of sheet-like, tape-like or band-like resin-containing long fiber bundles in which the fibers -are flattened, as prepared by cutting them into pellets having a predetermined length.

The gas to be introduced into the fiber-containing resin melt having been injected into the mold cavity in the manner mentioned above is not specifically defined. Generally employed is an inert gas such as room-temperature nitrogen, argon or the like. In order to more rapidly cool the resin melt and to promote the molding cycle, a cooling gas at 15° C. or lower, preferably at 0° C. or lower may be used. The gas may be introduced into the fiber-containing resin melt via a gas nozzle which is disposed inside the nozzle of the injection-molding device in which the melt resin is plasticized and injected into the mold cavity, or via a gas pin that opens toward any of the sprue, the runner or the cavity disposed inside the mold. Above all, it is desirable to introduce the gas into the resin melt via the gas pin disposed inside the mold, especially via the gas pin that opens toward the cavity of the mold. However, the gas introduction must be directed to the area of the resin melt except the rib-forming area thereof. The gas pin may be provided movably inside the cavity.

Preferably, the gas pressure falls between 0.1 and 30 MPa, more preferably between 1 and 20 MPa. Specifically, the pressure of the gas to be introduced into the resin melt is suitably determined, depending on the size, the shape and the blow ratio of the moldings to be produced, on the fluidity, the viscosity and the fiber content of the resin melt to be molded, and on the gate profile of the mold used. In the invention, the gas may be introduced into the resin melt under such a relatively low pressure. One reason is because the gas introduction is effected after the mold cavity has been expanded and because it is effected after the resin melt has been expanded to some degree owing to the spring-back function of the fibers in the resin melt. Therefore, in the method of the invention, there is little probability that the gas will leak between the surface of the resin melt and the surface of the mold adjacent to the resin melt, and there is also little probability that the moldings produced will have bad appearances with silver mark streaks, etc. In addition, in the step of cooling the moldings produced, the gas could be circulated therearound and discharged out of the mold, whereby the moldings of the shaped resin could be cooled within a shortened period of time. Another reason why the gas can be introduced into the resin melt under such a relatively low pressure will be because, when the fiber-containing resin melt is foamed, the gas could permeate through the foamed cell walls and therefore could easily disperse throughout the molding formed. As a result, the molding could have a large number of pores inside it. For these reasons, in the invention, a relatively large amount of a foaming agent may be added to the molding material to ensure more stable molding operation, irrespective of the total expansion of the molding. The gas introduced substantially participates in the formation of pores in the moldings and also in the formation of the hollow area therein. As its additional function, the gas introduced enhances the mold pattern transferability on the moldings produced and promotes the cooling speed of the moldings. For this, preferably, the gas is circulated through the mold and discharged from it, whereby the moldings of the shaped resin can be cooled within a shortened period of time. Specifically, the gas may be circulated through the mold and discharged from it by controlling the pressure at the gas-discharging outlet to a predetermined degree, whereby cooling the moldings produced may be promoted.

If desired, a skin material to be integrated with the surface of the molding may be disposed on the inner surface of the mold before a resin melt for the molding is injected thereinto. Using the mold of which the inner surface is previously coated with such a skin material, it is possible to obtain lightweight, layered resin moldings integrally coated with the layer of the skin material. The skin material maybe any of single-layered materials of, for example, fabrics such as woven fabrics, non-woven fabrics, etc., thermoplastic resin sheets or films, foamed sheets of thermoplastic resins, as well as pattern-printed films, etc.; or multi-layered materials comprising, for example, an outer layer of thermoplastic elastomers, polyvinyl chloride resins or the like, and a backing layer of thermoplastic resins, foamed sheets of thermoplastic resins or the like. The skin layer may be formed entirely or partially over the moldings.

In the method of the invention, a melt of the fiber-containing thermoplastic resin may be injected into the mold cavity in any ordinary injection-molding manner. For controlling the cavity clearance of the mold into which the resin melt is injected, the melt fluidity of the resin melt that may vary depending on the fiber content thereof, and the size of the moldings to be produced (this will vary depending on the flow length of the resin melt injected), and for preventing the resin melt from being oriented, employable is a method of injection and compression molding. In this method, a lower amount of the resin melt not enough to completely fill the mold cavity is first injected into the mold cavity, and thereafter the thus-injected resin melt is compressed by moving forward the movable mold unit or the moving mold member whereby the mold cavity is completely filled with the resin melt. For producing skin layer-integrated moldings, the method of injection and compression molding is often desirable.

The fiber-containing, foamable thermoplastic resin composition for use in the invention may comprise from 30 to 90% by weight of a thermoplastic resin and from 10 to 70% by weight of fibers, but preferably from 40 to 80% by weight of a thermoplastic resin and from 20 to 60% by weight of fibers. The blend ratio of the components to prepare the composition may be suitably determined, depending on the type and the melt viscosity of the thermoplastic resin, the type, the diameter and the length of the fibers, the thickness and the shape of the moldings to be produced, and the necessary properties of the moldings.

The foaming agent to be added to the fiber-containing thermoplastic resin so as to make the resin foamable is not specifically defined. Any suitable foaming agent may be used in any desired manner, depending on the melting temperature and other properties of the resin to which it is added. For example, usable are chemical foaming agents that generate gas when decomposed under heat, as well as physical foaming agents. The chemical foaming agents include, for example, oxalic acid derivatives, azo compounds, hydrazine derivatives, semicarbazides, azide compounds, nitroso compounds, triazoles, urea and its related compounds, nitrites, hydrides, carbonates, bicarbonates, etc. More concretely, herein usable are azodicarbonamide (ADCA), benzenesulfohydrazide, N,N-dinitropentamethylenetetramine, terephthalazide, etc. The physical foaming agents include, for example, pentane, butane, fluoride compounds, water, etc.

The foaming agent may be added to the resin composition in any desired manner. For example, a predetermined amount of the foaming agent may be added to the molding resin pellets; or the foaming agent is added to a thermoplastic resin to prepare a master batch, and the master batch may be added to the molding resin pellets. The amount of the foaming agent to be added may fall generally between 0.5 and 10 parts by weight, but preferably between 1 and 10 parts by weight, relative to 100 parts by weight of the fiber-containing thermoplastic resin. The amount of the foaming agent to be added is to ensure the resin melt expansion in the initial stage of mold cavity expansion. When the fibers in the resin melt has no ability to expand the resin melt, a relatively large amount of the foaming agent will be added to the resin melt. Therefore, in the invention, it is not always necessary that the resin melt contains long fibers, and the latitude in selecting the molding materials for use herein is broadened. Further if desired, stabilizers, antistatic agents, weather-proofing agents, colorants, fillers (e.g., talc), and also impact resistance improves such as various types of elastomers may be added to the molding materials for use in the invention.

The lightweight resin moldings of the invention are of a fiber-containing thermoplastic resin having a fiber content of from 10 to 70% by weight, and have a hollow area, in which the hollow area has a reinforcing rib structure. The moldings may have a plurality of hollow areas as spaced from each other via the reinforcing rib structure, or the hollow area in the moldings may have a plurality of ribs distributed therein.

The lightweight resin moldings of the invention are those having a fiber content of from 10 to 70% by weight and a porosity of from 25 to 70% by weight and having air-permeable pores dispersed therein; or are hollow lightweight resin moldings having a hollow area and having a fiber content of from 10 to 70% by weight and a porosity of from 25 to 95%. The air-permeable pores as referred to herein for the structure of the lightweight resin moldings are meant to indicate that the moldings do no have a macroscopically detectable, definite hollow area but are so constructed that gas is permeable through the structure of the moldings. The lightweight resin moldings of the invention are characterized in that even the solid area except the hollow area therein which is formed of a fiber-containing resin component is expandable by itself owing to the fibers existing therein. Some of them may have fine pores in the solid area except the hollow area therein. Accordingly, for the index of the degree of reduction in the weight of the lightweight resin moldings of the invention, the weight reduction could be approximately represented by the total porosity of each molding including the hollow area, or that is, by the mold cavity volume completely filled with a resin melt to be molded therein, relative to the maximum mold cavity volume having been finally expanded to have the final molding therein. As the fibers to be in the moldings, preferred are glass fibers, more preferably having a mean fiber length of from 1 to 20 mm.

The lightweight resin moldings of the invention are expected to have many applications in various fields, including, for example, car parts such as in-panel cores, bumper beams, door panels, door steps, roof racks, rear quarter panels, air cleaner cases, pillars, ceilings, engine covers, etc.; chassises for electric appliances such as radios, televisions, videos, etc.; housings and components of computers, printers, duplicators, etc.; parts and members for furniture, buildings and civil engineering construction, such as outer panels, partition panels, shelf boards, cable troughs, etc.

The advantages of the invention are described below with reference to concrete examples of the invention, which, however, are not intended to restrict the scope of the invention.

EXAMPLE 1

60% by weight of glass fiber-reinforced polypropylene pellets (containing 3% by weight of maleic anhydride-modified polypropylene) having a glass fiber content of 75% by weight, in which the glass fibers had a thickness of 13 $\mu$m and a length of 12 mm and were aligned in parallel, were dry-blended with 40% by weight of polypropylene pellets having a melt index (MI, at 230° C. under a load of 2.16 kg) of 30 g/10 min, to prepare a molding resin composition. To mold it, used was an injection-molding machine equipped with a screw having a clamping power of 850 tons and a compression ratio of 1.9. The screw reduces breakage of the glass fibers in the molding composition. The mold of the machine is as in FIG. 1(A). As illustrated, the mold was so settled that the protrusions 4 of the moving mold member 3 were inside the cavity 5. In that condition, the clearance (D1) between the fixed mold unit and the top of each protrusion of the moving mold member was 3 mm. In an injection unit (not shown), the molding resin composition was melted, plasticized and metered to have a volume corresponding to the mold cavity volume, and the thus-metered resin melt was injected into the mold cavity. Thus, the mold cavity was filled with the resin melt. Two seconds after the cavity filling, the moving mold member 3 was moved backward at a relatively high speed of 50 mm/sec. Immediately after the moving mold member 3 was moved so, nitrogen gas was introduced into the resin melt through two gas pins. The gas pressure was 15 MPa and the gas flow rate was 2 liters/sec. The moving mold member was moved backward to the position (D2: 12 mm) at which the final molding was to be completed, as in FIG. 1(B). Then, the mold was cooled, degassed, and opened by removing the movable mold unit 2, and the lightweight resin molding thus produced was taken out.

The lightweight resin molding had no sinkmarks and its surface was smooth and good. Its porosity including the hollow area and the fine pores therein was about 85%. This was sliced, and its inner structure was observed. It was found that the molding had a hollow area in the region where the moving mold member 3 was moved backward. It was also found that, of the molding, the peripheral part and the center part that had been sandwiched between the protrusions of the moving mold member in the mold cavity was highly densified and had a low porosity. The center part of the molding substantially had the function as a reinforcing rib, and the molding had good stiffness. On the other hand, when the gas was not introduced into the resin melt, the molding produced had many sinkmarks and its surface was not smooth and was not good.

EXAMPLE 2

70% by weight of glass fiber-reinforced polyamide resin (6,6-nylon) having a glass fiber content of 60% by weight, in which the glass fibers had a thickness of 13 μm and a length of 12 mm and were aligned in parallel, were dry-blended with 30% by weight of polyamide resin (6,6-nylon) to prepare a molding resin composition. To mold it, used was an injection-molding machine equipped with a screw having a clamping power of 850 tons and a compression ratio of 1.9. The screw reduces breakage of the glass fibers in the molding composition. The mold of the machine is as in FIG. 2(A). As illustrated, the fixed mold unit of the mold had two linear recesses 11 on its inner surface. The mold was so settled that the clearance (D1) of the cavity 5 could be 4 mm, by moving forward the movable mold unit 2. In an injection unit (not shown), the molding resin composition was melted, plasticized and metered to have a volume corresponding to the mold cavity volume, and the thus-metered resin melt was injected into the mold cavity. Thus, the mold cavity was filled with the resin melt. One second after the cavity filling, the movable mold unit 2 was moved backward at a relatively high speed of 30 mm/sec. Immediately after the movable mold unit 2 was moved so, nitrogen gas was introduced into the resin melt through three gas pins. The gas pressure was 15 MPa and the gas flow rate was 2 liters/sec. The movable mold unit was moved backward to the position (D2: 20 mm) at which the final molding was to be completed, as in FIG. 2(B). Then, the mold was cooled, degassed, and opened by removing the movable mold unit 2, and the lightweight resin molding thus produced was taken out.

The lightweight resin molding had no sinkmarks and its surface was smooth and good. Its porosity including the hollow area and the fine pores therein was about 79%. This was sliced, and its inner structure was observed. It was found that the molding had a hollow area in the region where the moving mold member 3 was moved backward. It was also found that, of the molding, the peripheral part and the center part that had been sandwiched between the protrusions of the moving mold member in the mold cavity was highly densified and had a low porosity. The center part of the molding substantially had the function as a reinforcing rib, and the molding had good stiffness.

EXAMPLE 3

Polypropylene pellets (having a melt index, MI at 230° C. and under a load of 2.16 kg of 30 g/10 min) containing 3% by weight of maleic anhydride-modified polypropylene were fed into a double-screw melt extruder via its hopper, and melted therein. After the pellets were melted in the extruder, chopped strands of glass fibers having a diameter of 13 μm and a length of 3 mm were fed into the extruder via its side feed mouth, and melted and kneaded therein. Thus were prepared resin pellets having a glass fiber content of 40% by weight. In those pellets, the glass fibers had a mean fiber length of 0.44 mm. To 100 parts by weight of the glass fiber-containing pellets, added were 7 parts by weight of a foaming agent (Polysuren E115 from Eiwa Chemical— this was in the form of a master batch having a foaming agent content of 11% by weight) These were blended to prepare a molding composition.

To mold the composition, used was an injection-molding machine equipped with a screw having a clamping power of 850 tons and a compression ratio of 2.8. The mold of the machine is as in FIG. 1 illustrating the conceptual view of the mold. As illustrated, the mold comprises a fixed mold unit 1, a movable mold unit 2, and a moving mold member 3 that slides through the movable mold unit 2, and these components form a mold cavity 4. First, the movable mold unit 2 was closed, and then the moving mold member 3 was moved forward to define the cavity clearance (D1), 3 mm, between the top of each protrusion 4 of the moving mold member 3 and the fixed mold unit 1, whereby the mold was settled as in FIG. 1(A). Next, the molding composition was melted, plasticized, metered, and jetted into the mold cavity. Thus, the mold cavity was filled with the resin melt so that its volume could correspond to the mold cavity thickness of 3 mm. Three seconds after the cavity filling, the moving mold member 3 was moved backward to the position at which the final molding could have a thickness of 15 mm, and the cavity was thus expanded. While the moving mold member 3 was moved backward, nitrogen gas was introduced into the resin melt via two gas-introducing pins formed through the fixed mold unit. The nitrogen gas pressure was 15 MPa. Then, the mold was cooled and opened, and the lightweight resin molding thus produced was taken out.

The lightweight resin molding had no sinkmarks and its surface was smooth and good. It had some minor silver streaks on the surface that had been adjacent to the gate. It was composed of a substantially dense skin layer that had been contacted with the mold surface, a peripheral inner part and a center part both having a relatively low density, and two hollow parts, and its total porosity (including the hollow parts) was about 80%. The cooling time for which the molding could be cooled without having any post-sinkmarks on its surface was about 120 seconds. The molding was mounted on a tool having a spun of 500 mm, and a weight of 50 kg was applied to its center. In that condition, the molding was not substantially deformed.

INDUSTRIAL APPLICABILITY

According to the invention, obtained are lightweight resin moldings of fiber-containing resin materials. Even when they have a flat structure having a large volume per unit area and having a large blow ratio, they still have high flexural strength, good stiffness and good heat resistance, as they have a hollow area reinforced with a reinforcing rib structure made of a fiber-containing resin component having a relatively high density. In addition, the moldings of the invention are well resistant to local stress and distortion applied thereto, and are highly homogeneous. They do not have sinkmarks and are not warped, and their outer surface is even and smooth. In the method for producing the moldings of the invention, the weight of the moldings to be produced can be well controlled and reduced to any desired degree. Even the moldings having a much reduced weight still have high strength and good surface appearances. In the method, the cooling time can be shortened and the molding cycle can also be shortened, and the productivity in the method is high.

What is claimed is:

1. A lightweight, hollow resin molding, comprising:
   at least one reinforcing rib in a hollow area;
   wherein said resin molding is formed from a fiber-containing thermoplastic resin having a fiber content of from 10 to 70% by weight;
   wherein said resin molding has an expanded structure formed by utilizing a spring-back function of said fibers which are entangled in said resin molding;

wherein said reinforcing rib has a greater thickness than an outer periphery of said resin molding; and wherein said outer periphery is connected to said reinforcing rib.

2. The lightweight, hollow resin molding as claimed in claim 1, having pores; and having a porosity including its hollow area of 25 to 95%.

3. The lightweight, hollow resin molding as claimed in claim 2, wherein said pores are air-permeable.

4. The lightweight, hollow resin molding as claimed in claim 3, wherein said air-permeable pores are dispersed.

5. The lightweight, hollow resin molding as claimed in claim 1, wherein the fibers are glass fibers having a mean fiber length of from 0.2 to 20 mm.

6. The lightweight, hollow resin molding as claimed in claim 1, wherein the fibers are glass fibers having a mean fiber length of from 2 to 15 mm.

7. The lightweight, hollow resin molding as claimed in claim 1, wherein the reinforcing rib is in a hollow area between opposite surfaces of the resin molding.

8. The lightweight, hollow resin molding as claimed in claim 1, having substantially no foaming agent.

9. A method for producing a lightweight, hollow resin molding, comprising:

injecting a melt of a fiber-containing molding material which comprises a fiber-containing thermoplastic resin having a fiber content of from 10 to 70% by weight and in which the fibers have a mean fiber length of from 2 to 50 mm, into a mold cavity of a mold equipped with a rib-forming member; or injecting and compressing the melt into a mold cavity of a mold equipped with a rib-forming member;

then expanding a volume of the mold cavity; and introducing a gas into the melt of the fiber-containing molding material after the start of the cavity expansion;

thereby obtaining said resin molding which comprises at least one reinforcing rib in a hollow area.

10. The method according to claim 9, wherein said mold equipped with said rib-forming member is so constructed that its cavity except a rib-forming area is expandable.

11. The method according to claim 9, wherein said mold equipped with said rib-forming member is so constructed that at least one of the facing surfaces of the mold members is partially protruded or recessed.

12. The method according to claim 9, wherein the melt of said fiber-containing molding material is prepared by plasticizing and melting fiber-containing thermoplastic resin pellets;

wherein said pellets have a total length of from 2 to 50 mm and contain fibers in an amount of from 20 to 80% by weight;

wherein a length of said fibers is the same as the total length of the pellets; and wherein the fibers are aligned in parallel to each other; or wherein the melt of said fiber-containing molding material is prepared by plasticizing and melting a mixture of said fiber-containing resin pellets and other pellets having a fiber content of between 10 to 70% by weight.

13. The method according to claim 9, wherein a speed at which a moving mold member is moved backward for expanding the volume of said mold cavity is between 1 and 200 mm/sec.

14. The method according to claim 9, wherein said melt of said fiber-containing molding material is foamable and is injected into the mold cavity; or wherein said melt of said fiber-containing molding material is foamable and is injected and compressed in the mold cavity to thereby fill the mold cavity with the resin melt;

then the mold cavity volume is expanded, and a gas is introduced into the resin melt after the start of the cavity expansion.

15. The method according to claim 9, wherein the melt of the fiber-containing molding material further comprises from 0.5 to 10 parts by weight of a foaming agent, relative to 100 parts by weight of the fiber-containing thermoplastic resin.

16. The method according to claim 9, wherein an expansion ratio of the mold cavity volume is between 1.3 and 20.

17. The method according to claim 9, wherein the cavity volume expansion is effected by moving a part of one mold member that forms the cavity.

18. A lightweight, hollow resin molding, obtained by a method, comprising:

injecting a melt of a fiber-containing molding material which comprises a fiber-containing thermoplastic resin having a fiber content of from 10 to 70% by weight and in which the fibers have a mean fiber length of from 2 to 50 mm, into a mold cavity of a mold equipped with a rib-forming member; or injecting and compressing the melt into a mold cavity of a mold equipped with a rib-forming member;

then expanding a volume of the mold cavity; and introducing a gas into the melt of the of a fiber-containing molding material after the start of the cavity expansion;

thereby obtaining said resin molding which comprises at least one reinforcing rib in a hollow area; and wherein said resin molding has an expanded structure formed by utilizing a spring-back function of said fibers which are entangled in the resin molding;

wherein said reinforcing rib has a greater thickness than an outer periphery of said resin molding.

* * * * *